Nov. 28, 1944.                C. H. VIDAL                2,363,709
MACHINE TOOL CHUCK
Filed July 14, 1943                2 Sheets-Sheet 2
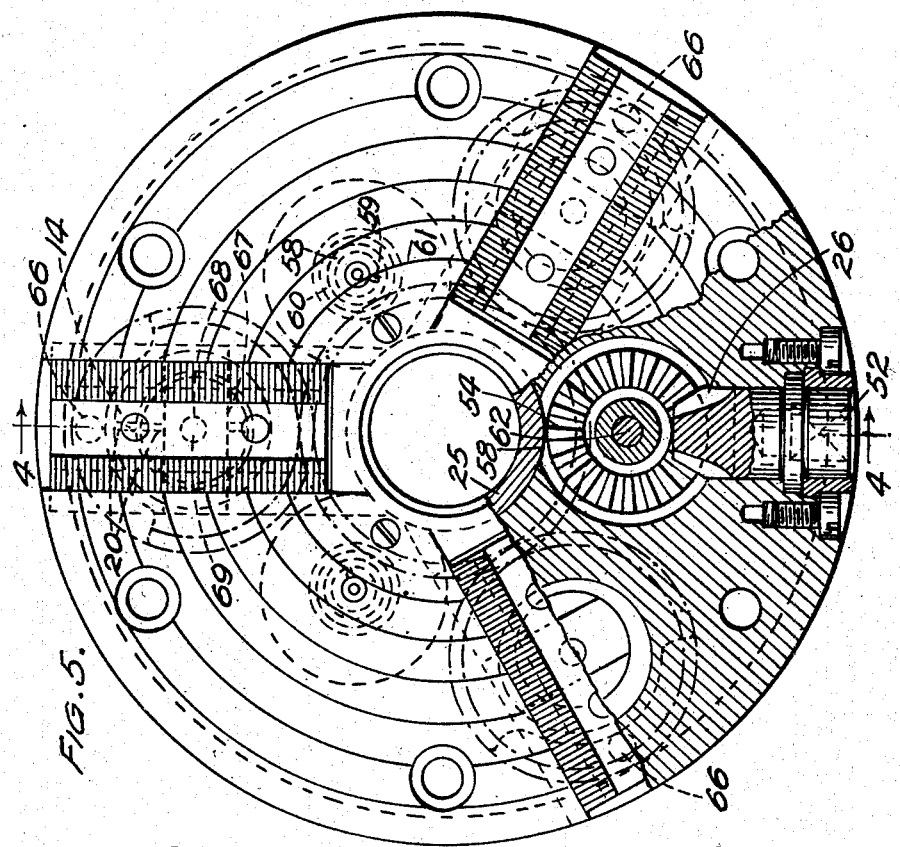
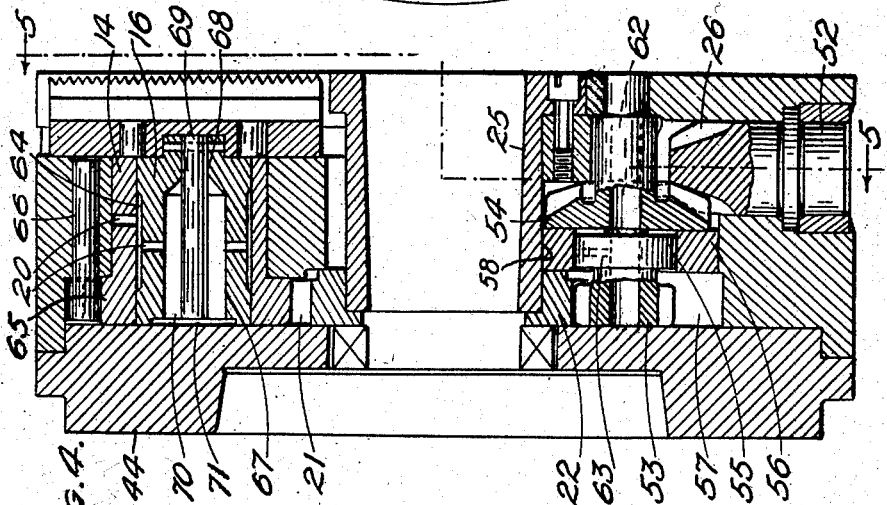
Charles H. Vidal
Inventor
by his attorneys
Stebbins, Blenko & Webb Patented Nov. 28, 1944

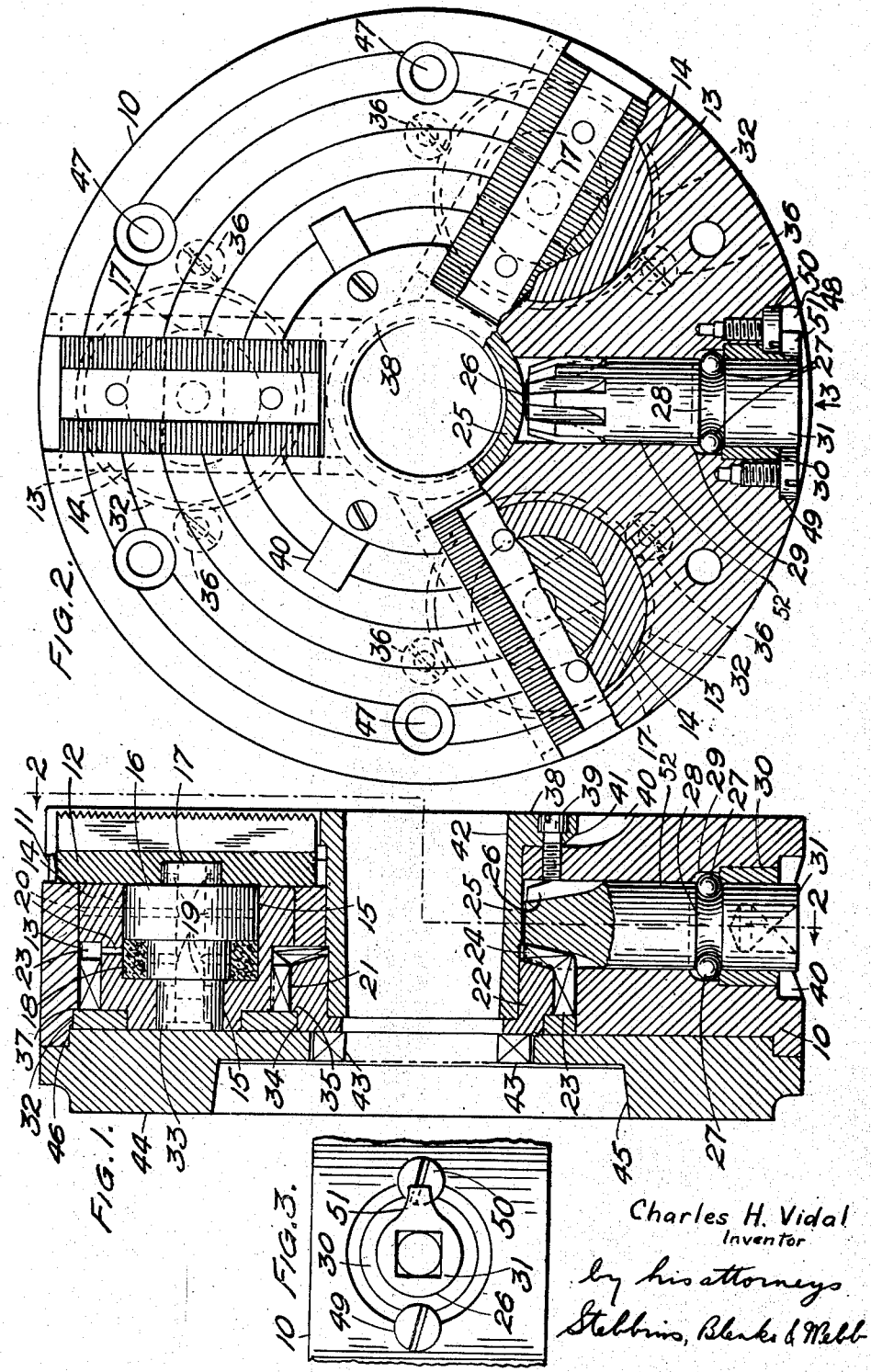

2,363,709

UNITED STATES PATENT OFFICE 2,363,709

MACHINE-TOOL CHUCK

Charles Henry Vidal, London, England

Application July 14, 1943, Serial No. 494,637
In Great Britain June 15, 1942

11 Claims. (Cl. 279—110)

This invention relates to machine tool chucks and particularly to chucks where large gripping forces are required and relates to that kind of chuck in which the chuck jaws or carriers for said jaws are mounted to slide in radial guides, and are provided with means for moving them simultaneously and to the same extent along said guides.

According to this invention a machine tool chuck of the kind referred to is characterised in that the movement imparted to each jaw or its carrier is by means of a separate eccentric mechanism, which eccentric mechanisms are grouped round and are driven by a single driving member.

Each said eccentric mechanism may comprise two relatively rotatable members mounted one upon the other, one of which members is mounted to rotate in the chuck so that the axis of relative rotation between the members is eccentric to the axis of rotation of the first said member in the chuck, and the other of which members is constrained against rotation by a sliding connection between it and a jaw carrier mounted in a radially-extending guide in the chuck, and which sliding connection extends transversely to the jaw guide.

It will be appreciated with this arrangement, that by suitably selecting the degree of eccentricity of the above-mentioned two axes, a large mechanical advantage may be provided for the single driving member in respect to the chuck jaws, or their carriers.

Each of the rotatable members may be provided with a gear track, and the single driving member may comprise a pinion rotatably mounted in the chuck and engaged by the gear tracks.

In one form of the invention each of the members rotatably mounted in the chuck is provided with an internal bearing surface, the axis of which is eccentric to the axis of rotation of the member, and a journal is rotatably mounted in each internal bearing surface, a tongue-and-slot connection being provided between one end of each journal and a part of a jaw or jaw-carrier so as to provide relative rectilinear movement diametrically across the journal.

The aforesaid gear tracks on the rotatable members may be engaged by a single hollow pinion having gear teeth on a peripheral portion thereof, and said pinion is engaged by hand operating gearing having a number of operating shafts extending out through radially arranged passages in the chuck body. In one form of construction said single hollow gear is provided both with spur teeth on its periphery and with bevel teeth on a side face thereof which latter teeth are engaged by a bevel pinion on each of said operating shafts. In an alternative arrangement the operating shafts are provided with bevel pinions whereby a compound intermediate gear wheel is provided between each bevel pinion and said hollow gear wheel.

An important feature of the invention consists in that the chuck body is formed in one part having recesses in one face thereof for accommodating the relatively rotatable members of the eccentric mechanism, and slots in the opposite face for engaging the jaws or their carriers, which relatively rotatable members are held in their respective recesses either each by a ring located in a recess in the chuck body or by a back plate secured to the chuck body.

Other constructional features of the invention are set out in the following description which is made with reference to the accompanying drawings, in which:

Figure 1 is a section through the chuck along the axis of rotation;

Figure 2 is a view of the chuck partly in elevation and partly in section along the line 2—2 of Figure 1;

Figure 3 is an elevation of the stop means and indicator associated with the jaw-operating gear; and Figures 4 and 5 are views similar to Figures 1 and 2 showing a modification.

The main chuck body 10 is formed in one part, the front face thereof being provided with three radially extending slots 11 for engagement by the jaw carriers 12. Three cylindrical recesses 13 extend from the back face of the chuck body up as far as the radial slots and each is engaged by a rotatable member in the form of a bush 14 provided with a stepped eccentric bore 15. Mounted in each stepped bore is a stepped journal member 16 having a projecting cross-piece 17 at one end which slidingly engages a cross-slot formed on the inner face of the jaw-carrying member 12. One of the stepped portions of the journal member is so dimensioned as to provide a space between it and the eccentric bush 14, which space receives an absorbent felt ring 18 by which lubricant is fed to passages 19 formed in the journal member and to communicating lubricating passages 20 in the eccentric bush. The inner end of each eccentric bush is provided on the outer face thereof with straight gear teeth 21, which gear teeth on the three eccentric bushes are engaged by a hollow gear wheel 22 having straight teeth 23 merging with bevel teeth 24. The hollow gear wheel is rotatably mounted on a central sleeve 25 which is a jamming fit in a bore formed in the centre of the chuck body. The sleeve 25 is provided with a flange 38 housed within a recess formed in the front face of the chuck body, and clamped to the chuck body by set screws 39. The aforesaid recess in the face of the chuck body is provided with cut-away portions 40 and the under face of the flange is bevelled at 41, thereby enabling a tool to be inserted into a cut-away portion and beneath the flange, whereby the sleeve may be readily removed. This sleeve is arranged to accommodate any of a number of pilot bushes having different sizes of bores. Three radial passages are formed in the chuck body, in which are rotatably mounted bevel pinions 26 which engage the aforesaid bevel teeth 24 and have shafts 52 carried by ball-bearings 27 located between races 28 and 29 formed on the shafts 52 and chuck body respectively, the balls being held in position by suitable sleeves 30. The end of each shaft 52 is provided with a squared recess 31 for engagement by a key.

The eccentric bushes and the hollow pinion are held in position within the chuck body by flat rings 32 which have holes therein for accommodating the reduced ends 33 of the stepped journals, and the inner edge 34 of each ring overlaps a shoulder 35 formed on said hollow gear wheel. The rings are held in position on the chuck body by a number of countersunk set-screws 36, as best seen in Figure 2, and the inner face at the marginal edge of each ring abuts against a shoulder 37 formed at the end of the bore 13 in the chuck body.

The inner end of the hollow gear wheel may be provided with dog teeth 43 which project beyond the inner face of the chuck body. The unitary construction thus far described is applicable to any machine tool, and for this purpose is provided with a suitable back plate 44 which may for example have a conical recess 45 formed in the outer face thereof for engaging a correspondingly-shaped flange on the spindle of the machine tool. Thus by providing a suitable back plate the chuck may be applied to many different forms of spindle attachment. A spigot joint 46 may be provided between the mounting plate and the chuck body, and these two parts are held together by screws 47 having countersunk heads which lie flush with countersunk holes in the front face of the chuck and having screw-threaded shanks which engage the aforesaid mounting plate 44.

In the case where the machine tool spindle is hollow, the chuck may be operated in known manner by means of a motor mounted at the other end of the spindle, and which drives a tubular shaft having dog-teeth which engage the aforesaid dog-teeth 43. For example, there may be employed a hollow operating shaft driven by a motor. Alternatively, the chuck may be operated by a key which engages the square socket 31 at the end of any of the shafts 52.

In the above form of chuck the jaws have comparatively small movement, and when no work is being clamped by the jaws it may be difficult to ascertain whether they are in the open or closed position. An indicator is therefore provided by forming a pointer 51, see Figure 3, at the end of each shaft 52, which pointer is located in a recess 48 in the chuck body, and its movement is limited by the head 49 of a setscrew which also fulfills the function of holding the sleeve 30 in position. A second setscrew 50 is also provided for that purpose but is arranged out of the path of movement of the pointer 51. The position of the pointer 51 with respect to the head of the setscrew 49 is indication of the position of the chuck jaws.

The alternative but preferred form of construction shown in Figures 4 and 5 is very similar to that described above, with the following exceptions. Instead of each hand-operated bevel pinion 26 being arranged to engage the hollow gear wheel 22 directly, there is an intervening compound gear wheel having spur teeth 53 on one portion and bevel teeth 54 on another part. Each compound pinion is provided with a journal portion 55 between the two sets of teeth which is carried by a bearing formed in a ring 56. A suitable cavity 57 is formed in the chuck body for each of the compound pinions and its bearing ring, which cavities are of cylindrical formation and intersect the central bore in which the tapered sleeve 25 is mounted. Owing to these intersections each ring 56 requires to be flattened at 58, as seen in Figure 5, so as not to project into said central bore. By means of these intermediate compound pinions, a reduction gearing may be provided between the hand-operated bevel pinion 26 and the hollow gear-wheel 22. In view of this reduction gearing, it is not convenient to provide the hand-operated shaft 52 with an indicator for showing the positions of the jaws, but an indicator is provided by the end of the shaft 58 which carries the compound pinion and which extends through a hole in the face of the chuck body. As will be seen by Figure 5, the end of the shaft 58 is provided with a nick 59 which moves between marks 60 and 61 indicating the open and closed conditions of the jaws. The shaft 58 is provided with an oiling passage 62 which may be filled with oil-impregnated material and branch passages 63, whereby the oil is led to the bearing surfaces.

The eccentric bush 14 and journal portion 16 differ somewhat from that described with reference to the first construction. For example, it will be noted that the journal 16 is not stepped, but is of a general cylindrical configuration, although it is provided with a slight annular depression 64. The gear-track 21 on the eccentric bush is formed on an outwardly directed flange and the teeth on the flange are interrupted along a part of the circumference, as indicated at 65, and a pin 66 secured in the chuck body is arranged to project into this interrupted part of the flange and provides a stop for limiting the extent of rotation of each eccentric, so that the eccentrics never reach dead-centre positions. The retaining ring 32 referred to in connection with Figure 1 is dispensed with, and the eccentric bush and the journal are retained in their recesses by means of the backplate 44. The journal portion 16 is provided with a stepped bore, the parts 67 and 68 being filled with oiling pads 69 and 70 retained in position by a closure disc 71 at one end of the journal.

I claim:

1. A machine-tool chuck comprising a chuck body having a number of radially extending slots in one face thereof, a jaw member slidably mounted in each slot, a single driving member mounted centrally of the chuck body, a separate eccentric mechanism mounted in the chuck body engaging each jaw member, and grouped around in driving connection with said single driving member, each of which eccentric mechanisms comprises a member mounted to rotate about an axis fixed in relation to the chuck body and having an eccentric bore and a journal member rotatably mounted in said bore and connected to the jaw or jaw carrier by a pin and slot connection extending transversely to the jaw guide.

2. A machine-tool chuck comprising a chuck body having a number of radially extending slots in one face thereof, a jaw slidably mounted in each slot, a driving gear wheel rotatably and centrally mounted in the chuck body, a number of members mounted in the chuck body to rotate about fixed axes, gear teeth associated with each said member in engagement with said gear wheel, each of which members is provided with a cylindrical eccentric bore, a journal member rotatably mounted in each bore, and a tongue-and-slot connection between each said journal member and one of said jaw members.

3. A machine-tool chuck comprising a chuck body having a number of radially extending slots in one face thereof, a jaw member slidably mounted in each of said slots, a single hollow driving gear having gear teeth on a peripheral portion thereof and bevel teeth on a side face thereof, a number of eccentric mechanisms grouped around said gear wheel, one part of each of which eccentric mechanisms is rotatable about a fixed axis in the chuck body and is provided with teeth for engaging said gear wheel and with an eccentric cylindrical bore and the other part of each of which eccentric mechanisms comprises a journal engaging said bore and a cross-slot in a jaw member, and operating pinions rotatably mounted in the chuck body and engageable with the bevel teeth on said hollow pinion.

4. A machine-tool chuck comprising a one-part chuck body having recesses formed in one face thereof, an eccentric mechanism comprising one part mounted to rotate about a fixed axis in each said recess and is provided with an eccentric cylindrical bore and another part which is mounted in said bore, which chuck body is formed in the opposite face thereof with a number of radially-extending guides, a jaw member in each guide, a sliding connection between the second member of the eccentric mechanism and the jaw member, which first said eccentric part is provided with peripheral gear teeth, a centrally and rotatably mounted driving gear wheel rotatably mounted in the chuck body and in engagement with said peripheral gear teeth, and means for rotating said gear wheel.

5. A machine-tool chuck comprising a one-part chuck body having recesses formed in one face thereof, an eccentric mechanism comprising one part mounted to rotate about a fixed axis in each said recess and provided with an eccentric cylindrical bore, and another part which is mounted in said bore, which chuck body is formed in the opposite face thereof with a number of radially extending guides, a jaw member in each guide, a sliding connection between the second part of the eccentric mechanism and the jaw member, which first said eccentric part is provided with peripheral gear teeth, a centrally and rotatably mounted driving gear wheel rotatably mounted in the chuck body and in engagement with said peripheral gear teeth, a compound intermediate gear pinion having spur teeth in engagement with the teeth of the driving gear and also having bevel teeth, a bevel pinion in engagement with said latter teeth, and a shaft carrying said bevel pinion and extending out through a radially-extending passage in the chuck body.

6. A machine-tool chuck comprising a one-part chuck body having recesses formed in one face thereof, an eccentric mechanism comprising one part mounted to rotate about a fixed axis in each said recess and provided with an eccentric cylindrical bore, and another part which is mounted in said bore, which chuck body is formed in the opposite face thereof with a number of radially extending guides, a jaw member in each guide, a sliding connection between the second part of the eccentric mechanism and the jaw member, which first said eccentric part is provided with peripheral gear teeth, a centrally and rotatably mounted driving gear wheel rotatably mounted in the chuck body and in engagement with said peripheral gear teeth, means for rotating said gear wheel, and a ring arranged to maintain each eccentric mechanism in its recess, and provided with a bearing for accommodating the end of the first said rotatable member of the eccentric mechanism.

7. A machine-tool chuck comprising a one-part chuck body having recesses formed in one face thereof, an eccentric mechanism comprising one part mounted to rotate about a fixed axis in each said recess and provided with an eccentric cylindrical bore, and another part which is mounted in said bore, which chuck body is formed in the opposite face thereof with a number of radially extending guides, a jaw member in each guide, a sliding connection between each second part of the eccentric mechanism and the jaw member, which first said eccentric mechanism is provided with peripheral gear teeth, a centrally and rotatably mounted driving gear wheel rotatably mounted in the chuck body and in engagement with said peripheral gear teeth, means for rotating said gear wheel, a mounting plate secured to the unitary chuck body and means for securing the mounting plate to the back plate on a machine-tool spindle.

8. A machine-tool chuck comprising a chuck body having a number of radially extending slots in one face thereof, a jaw slidably mounted in each slot, which chuck body is provided with a central bore having an enlarged portion at one end, a sleeve mounted in the smaller end of said bore and projecting into the enlarged portion, a hollow gear wheel rotatably mounted on the projecting end of said sleeve within the enlarged part of the bore, a number of eccentric mechanisms grouped around the hollow gear wheel and each having one part mounted to rotate about a fixed axis in a recess in the chuck body and provided with gear teeth in engagement with the gear wheel and with an eccentric bore for accommodating the other part of the eccentric mechanism, and a sliding connection between each latter member and a jaw member.

9. A machine-tool chuck comprising a chuck body having a number of radially extending slots in one face thereof, a jaw slidably mounted in each slot, which chuck body is provided with a central bore having an enlarged portion at one end, a sleeve mounted in the smaller end of said bore and projecting to the enlarged portion, which sleeve is provided with a flange, chamfered on its inner face, located in a recess in the front face of the chuck body, and which chuck body is provided with cut-away portions around each recess, a hollow gear wheel rotatably mounted on the projecting end of said sleeve within the enlarged part of the bore, a number of eccentric mechanisms grouped around the hollow gear wheel, each having one part mounted to rotate about a fixed axis in a recess in the chuck body and provided with gear teeth in engagement with the gear wheel and with an eccentric bore for accommodating the other part of the eccentric mechanism, and a sliding connection between each latter part and a jaw member.

10. A machine-tool chuck comprising a chuck body having a number of radially extending slots in one face thereof, a jaw member slidably mounted in each of said slots, a single hollow driving gear having gear teeth on a peripheral portion thereof merging with bevel teeth on a side face thereof, a number of eccentric mechanisms grouped around said gear wheel, each having one part mounted to rotate about a fixed axis in a recess in the chuck body and provided with teeth for engaging said gear wheel and with an eccentric bore for accommodating the other part of the eccentric mechanism, and a connection between the other part of each eccentric mechanism, and a jaw member, operating pinions rotatably mounted in the chuck body and engageable with the bevel teeth on said hollow pinion, shafts carrying said operating pinions, a projection on each of said shafts and a stop on the chuck body in the path of movement of each said projection.

11. A machine-tool chuck comprising a chuck body having a number of radially extending slots in one face thereof, a jaw member slidably mounted in each of said slots, a single hollow driving gear having gear teeth on a peripheral portion thereof merging with bevel teeth on a side face thereof, a number of eccentric mechanisms grouped around said gear wheel, one part of each of which eccentric mechanisms is mounted to rotate about a fixed axis in a recess in the chuck body and is provided with teeth for engaging said gear wheel and with an eccentric bore for accommodating the other part of the eccentric mechanism, and a connection between the other part of each eccentric mechanism and a jaw member, operating pinions, shafts carrying said pinions rotatably mounted in the chuck body and engageable with the bevel teeth on said hollow pinion, and an indicator driven by each said shaft.

CHARLES HENRY VIDAL.